March 13, 1934.  E. R. EVANS  1,950,602
BRAKE LINKAGE
Filed Dec. 26, 1931   3 Sheets-Sheet 1
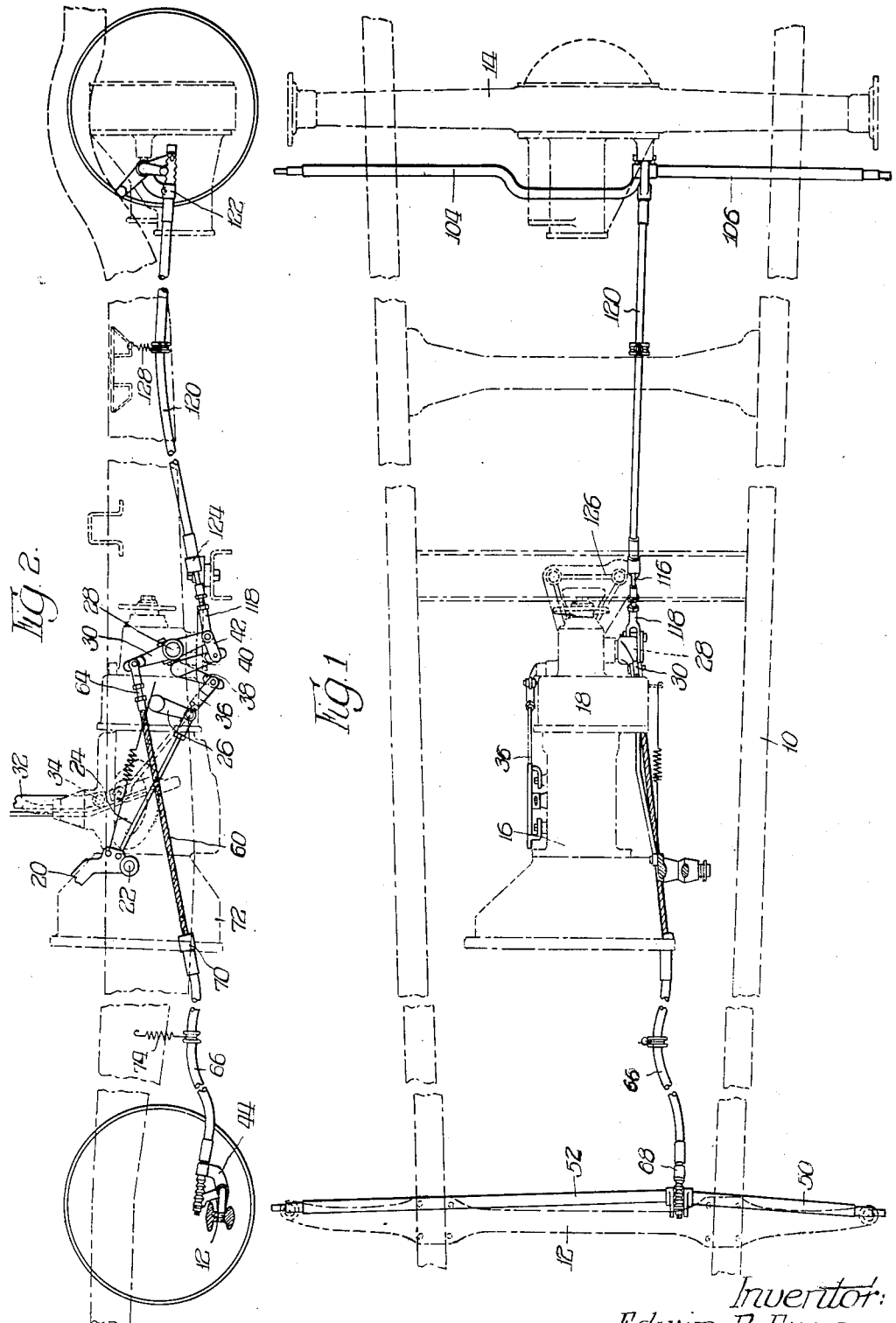
Inventor:
Edwin R. Evans,

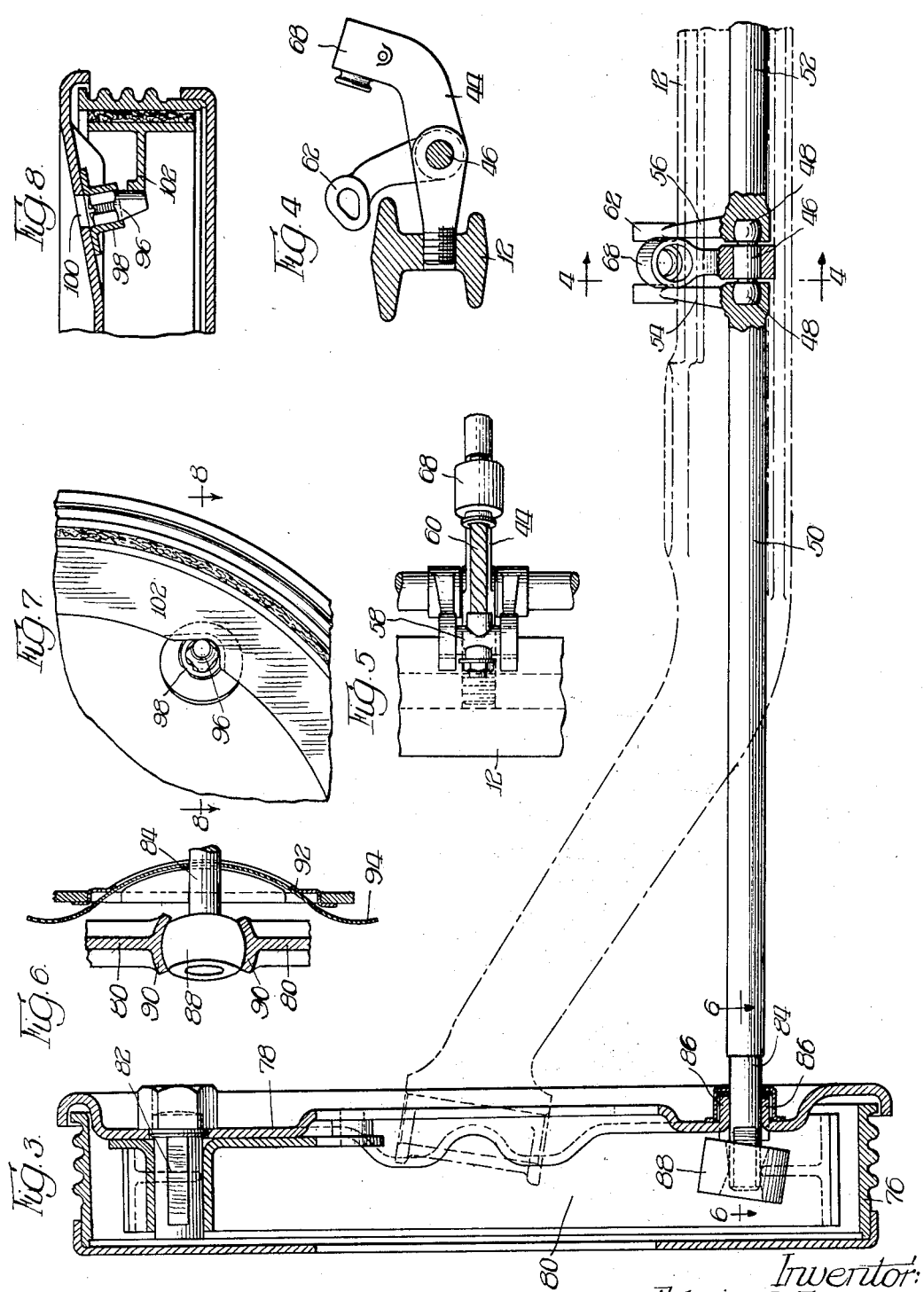

March 13, 1934.  E. R. EVANS  1,950,602
BRAKE LINKAGE
Filed Dec. 26, 1931  3 Sheets-Sheet 3
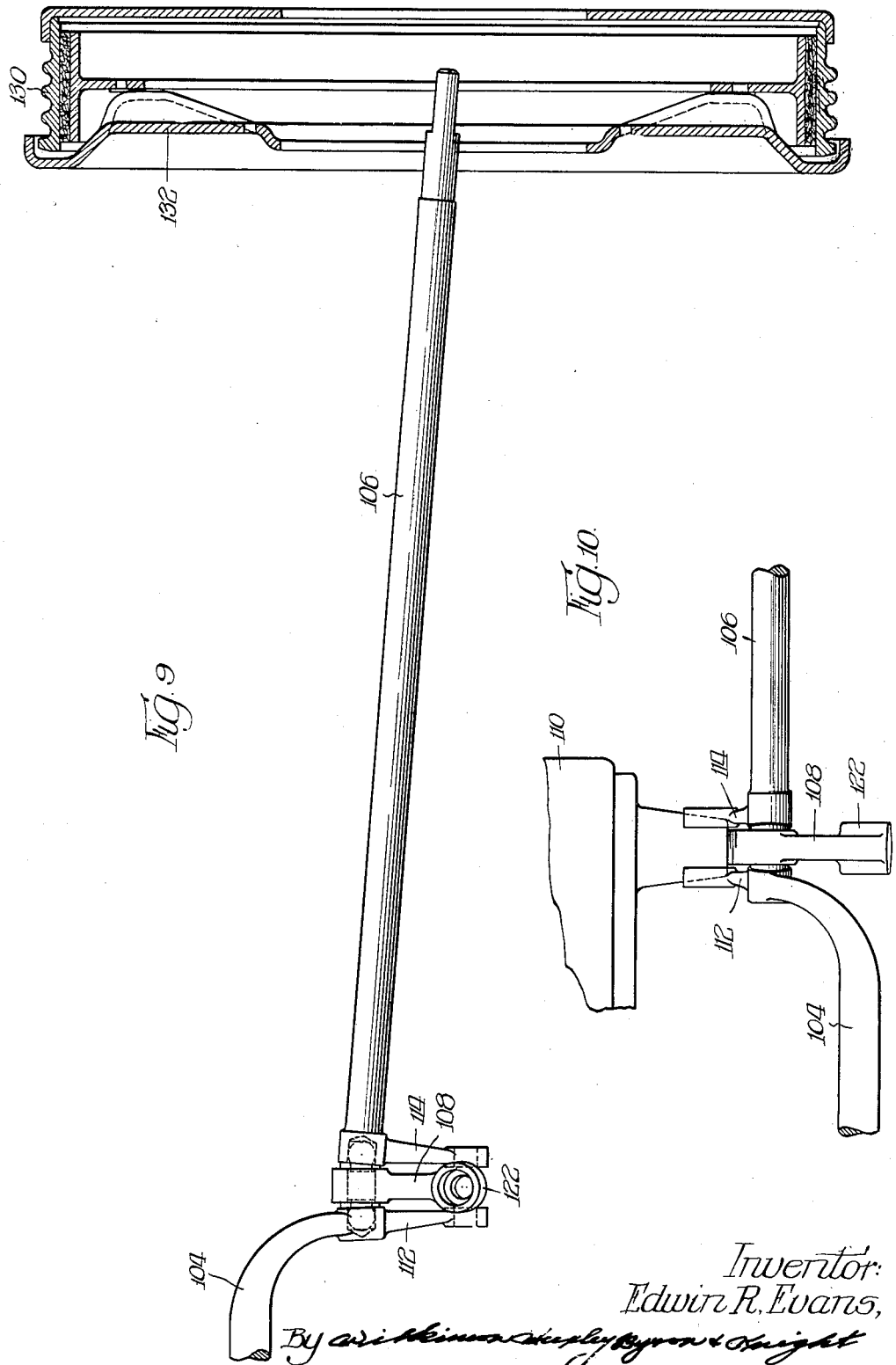
Inventor:
Edwin R. Evans, Patented Mar. 13, 1934

1,950,602

UNITED STATES PATENT OFFICE 1,950,602

BRAKE LINKAGE

Edwin R. Evans, Chicago, Ill.

Application December 26, 1931, Serial No. 583,299

3 Claims. (Cl. 188—190)

This invention relates to improvements in brake linkage for motor vehicles and particularly to improvements for preventing variation in the distribution of the braking pressure to the wheel brakes due to movement of the engine frame longitudinally of the vehicle relative to the brakes.

There has been previously disclosed a brake linkage including a power brake in which the power brake casing is rigid with respect to the transmission casing and therefore rigid with the engine frame. The power brake casing carries a pivot for a brake applying lever which is connected to brake actuating cross shafts pivotally supported by the front and rear axles at their inner ends and carried at their outer ends by the wheel brakes. It has become quite common practice to flexibly support the engine frame upon the chassis for the purpose of absorbing vibrations and in such case the engine frame may have a slight relative movement longitudinally of the vehicle with respect to the chassis and with respect to the axles. In such case, unless provision is made for counter-acting this movement, there is a tendency towards decreasing the braking pressure upon the front wheel brakes and increasing the braking pressure upon the rear wheel brakes due to the movement of the engine frame forwardly of the vehicle upon braking action. This effect is considered undesirable since it is usually desired to maintain a predetermined distribution of the braking pressure between the front and rear wheel brakes.

It is therefore an object of the present invention to provide means for preventing any variation in the distribution of the braking pressure should the pivot for the brake applying lever move relative to the axle which supports the wheel brakes.

It is further an object of the present invention to provide a cable connection between the brake lever and the rockable brake shafts supported by the axle and a flexible conduit receiving a portion of the cable, which is fixed at one end with respect to the engine frame and is fixed at the other end with respect to the pivotal supports for the inner ends of the brake actuating rock shafts whereby the bending of the conduit takes care of any variation in the distance between the pivot points.

Further and additional objects and advantages of the present improvements will be more readily apparent from the following description taken in connection with the attached drawings, in which Figure 1 is a plan view of the brake linkage associated with a chassis, shown diagrammatically;

Figure 2 is a side elevation of Figure 1;

Figure 3 is a view partially in section taken through one of the front wheel brakes and the support for the brake shafts upon the axle;

Figure 4 is a detail section taken on the plane indicated 4—4 in Figure 3;

Figure 5 is a plan view showing the cable connection to the brake shafts supported by the front axle, the flexible cover appearing in Figures 1 and 2 being removed in this figure for clarity;

Figure 6 is a detail section illustrating the sealing means for the brake shaft of one of the front wheel brakes;

Figure 7 is a detail view of a brake centralizer;

Figure 8 is a section taken on the plane indicated 8—8 in Figure 7;

Figure 9 is a view taken transversely of the vehicle looking rearwardly upon the support for the rear brake shafts, and Figure 10 is a plan view of the support for the rear brake shafts.

The vehicle chassis in Figures 1 and 2 is shown diagrammatically and indicated generally 10 and includes a front axle 12 and rear axle 14. There is shown in diagram a transmission casing 16 which is understood to be rigidly secured to the engine frame. It is to be further understood that the present improvements are particularly applicable to motor vehicles of the present commercial type in which the engine frame is flexibly supported upon the chassis so that in braking the vehicle the inertia may cause movement of the engine frame forward relative to the chassis. In fact, it is quite common for this movement to be as much as one-half inch. If the pivot for a double arm brake lever also moves with the engine frame, there will be an undesirable distribution of the braking pressure between the front and rear wheel brakes.

It is now well-known to employ a power brake, the casing of which is shown diagrammatically at 18, and it may be made integral with or attached to the transmission casing 16. It is to be understood that the usual foot pedal 20, carried by pivot 22 upon the engine frame, is connected by a link 24 to the input lever 26 of the power brake unit. The power brake has an output rock shaft 28 which transmits movement to a double arm brake lever 30. The emergency lever 32, pivoted at 34, is connected by a slack take-up link 36 to a lever arm 38 which is connected by a cross shaft to a lever arm 40 on the opposite side of the transmission casing which is connected by a pivoted link 42 to the lower extremity of the double arm brake lever 30.

The front axle 12 has secured thereto a bracket support 44, shown most clearly in Figure 4. The bracket 44 serves to support a pin 46 having ball-shaped ends 48 which form universal pivot supports for the inner ends of the brake operating cross shafts 50 and 52. The shafts 50 and 52 are supported at their outer ends by the brakes, as will be hereinafter described. The shafts 50 and 52 have integrally formed therein, at their inner ends, lever arms 54 and 56 which extend upwards and are operatively connected by a cross pin 58 to a cable 60. The pin 58 is mounted in irregular shaped openings 62 formed at the upper end of lever arms 56 and 54, as shown in Figure 4, to prevent rotation of the pin 58. The cable 60 is connected at its rearward end by an adjustable link 64 to the upper end of the double arm brake lever 30, as shown in Figure 2. The cable through a portion of its length extends through a flexible housing or conduit 66 which is fixed at one end to an abutment 68 formed integral with the bracket 44 and connected at its opposite end to a bracket 70 fixed to the fly wheel housing shown diagrammatically at 72 which is understood to be rigid with respect to the engine frame. The conduit 66 is normally tensioned by spring 74 to keep the cable taut, and it is to be understood that normal operation of the brake lever 30 will serve to pull the cable through the conduit and actuate the brake operating cross shafts carried by the front axle. If the pivot for the brake lever 30 should tend to move forward relative to the chassis frame during braking of the vehicle, such as will occur if the engine is flexibly mounted, the spring 74 will act to take up the slack in the conduit 66 thereby taking up the slack in the cable 60 so that the braking pressure upon the front wheel brakes will not be affected by movement of the pivot 28 relative to the front axle.

It will be noted in Figure 1 that the shafts 50 and 52 are substantially straight but are slightly inclined with respect to each other. The outer ends of the shafts 50 and 52 are disposed beneath the king pin centers of the axle 12, the ends of which are bent slightly rearwardly beyond the spring seats. It is to be understood that if the axle is straight the shafts would have to be cranked around the axle.

In Figure 3 there is shown a rotatable brake drum 76, a backing plate 78 and brake shoes 80 within the brake drum supported by the anchor pin 82 at the top of the brake. The reduced end 84 of shaft 50 is slidably supported by outwardly directed flanges 86 formed integral with the backing plate 78.

As shown in Figure 6 the shaft 50 is free to have a slight angular movement with respect to the backing plate to permit turning of the front wheels. The shaft 50 is connected within the brake drum to a slidable brake actuating cam 88 which is supported between the ends 90 of the brake shoes 80, as illustrated in Figure 6. The opening in the backing plate which receives the reduced end 84 of the shaft 50 is sealed by a pressed-metal member 92 carried by the backing plate and a flexible strip 94 which is carried by the portion 84 of the shaft 50.

Figures 7 and 8 illustrate a centralizer 96 supported by boss 98 carried by the backing plate, which has an opening 100 for adjustment of the centralizer. The conical inner end of the centralizer bears against the radial flange 102 of one of the brake shoes.

The support for the rear brake cross shafts 104—106 is substantially the same as the support for the front shafts 50 and 52. There is shown in Figure 10 a bracket 108 carried by the differential housing 110. The shafts have integral lever arms 112—114 which are connected to a cable 116 in the same manner as the cable 60 is connected to the lever arms 54—56. The cable 116 is connected at its forward end to the lower end of the brake lever 30 by the adjustable link 118. There is provided a flexible cable conduit 120 having an abutment 122 at its rearward end upon the bracket 108 and an abutment 124 at its forward end rigid with respect to an extension 126 from the power brake casing. The cable conduit 120 is tensioned by a spring 128 extending between the conduit and the chassis frame. Thus, if the engine frame, together with the transmission casing and power brake casing, moves forward relative to the chassis frame, the cable conduit 120 will be straightened since the forward abutment 124 will move relative to the abutment 122, thereby preventing any interference with the distribution of braking pressure to the rear brakes. The outer ends of the brake shafts 104—106 are supported by the rear wheel brakes in a manner similar to the supports at the front wheel brakes and in Figure 9 there is shown a rotatable rear wheel brake drum 130 and a backing plate 132.

I claim:

1. In a brake linkage for motor vehicles, front and rear axles, front and rear brakes supported by said axles, a power brake casing rigid with the engine frame, a double arm brake lever pivotally supported by said power brake casing, pivotally supported brake applying members for each of said brakes, a flexible cable extending between the double arm brake lever and the brake applying members for the front and rear brakes, and a flexible conduit housing a portion of the cable extending forwardly and rearwardly from said brake applying lever, each of said conduits having abutments rigid with the power brake casing at one end and movable with the pivotal supports for said brake applying members at the other end.

2. In a brake linkage for motor vehicles, an axle, brake mechanisms carried by said axle, a frame supported on said axle and movable relative to said axle, a housing flexibly supported by said frame, a brake lever pivotally carried by said housing, a flexible cable connecting said brake lever to said brake mechanisms, a flexible conduit enclosing a portion of said cable, said conduit having an abutment at one end movable with said axle and an abutment at the other end movable with said housing.

3. In a brake linkage for motor vehicles, an axle, brake mechainsm supported by said axle, a pair of brake actuating rock shafts supported at their outer ends by said brake mechanism and pivotally supported at their inner ends by said axle, a frame flexibly supported upon said axle, a housing flexibly supported by said frame, a brake applying lever pivotally carried by said housing, a flexible cable connecting said brake lever to the inner ends of said rock shafts, a flexible conduit enclosing a portion of said cable, said conduit having an abutment at one end fixed to said axle intermediate the inner ends of said rock shafts and an abutment at the other end fixed to said housing.

EDWIN R. EVANS.